United States Patent
Abe (10) Patent No.: US 8,434,446 B2
(45) Date of Patent: May 7, 2013

(54) AIR INTAKE DEVICE FOR MULTI-CYLINDER INTERNAL COMBUSTION ENGINE

(75) Inventor: Kazuyoshi Abe, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 920 days.

(21) Appl. No.: 12/140,633

(22) Filed: Jun. 17, 2008

(65) Prior Publication Data

US 2009/0038573 A1 Feb. 12, 2009

(30) Foreign Application Priority Data

Aug. 6, 2007 (JP) .................. 2007-204243

(51) Int. Cl.
*F02M 35/10* (2006.01)
*F02M 37/04* (2006.01)
*F02B 15/00* (2006.01)
*F02G 5/00* (2006.01)

(52) U.S. Cl.
USPC .................................... 123/184.42

(58) Field of Classification Search ............. 123/184.21, 123/184.22, 184.36, 184.47, 184.34, 184.45, 123/184.42, 184.55, 184.53, 432, 506, 547
See application file for complete search history.

(56) References Cited

U.S. PATENT DOCUMENTS

| 4,549,506 | A | * | 10/1985 | Rush et al. ............... | 123/184.36 |
| 4,741,294 | A | * | 5/1988 | Yasuda et al. ............ | 123/184.36 |
| 5,056,473 | A | * | 10/1991 | Asaki et al. .............. | 123/184.31 |
| 5,133,308 | A | | 7/1992 | Hitomi et al. | |
| 6,250,272 | B1 | * | 6/2001 | Rutschmann et al. ... | 123/184.57 |

FOREIGN PATENT DOCUMENTS

| JP | 7-30696 | 4/1995 |
| JP | 2003-307159 | 10/2003 |
| JP | 2005-325696 | 11/2005 |
| JP | 2007-16755 | 1/2007 |

* cited by examiner

*Primary Examiner* — Lindsay Low
*Assistant Examiner* — Charles Brauch
(74) *Attorney, Agent, or Firm* — Oblon, Spivak, McClelland, Maier & Neustadt, L.L.P.

(57) ABSTRACT

An air intake device 40 comprises: a surge tank 44 having an upper tank chamber 50, a lower tank chamber 52, and a communication portion 56; a first intake pipe 46 having communication with the upper tank chamber 50; a second intake pipe 48 having communication with the lower tank chamber 52; and a valve 58 disposed in the lower tank chamber 52, the valve 58 being displaced between a closed position, in which an internal space of the lower tank chamber 52 is divided into a main space 60 having communication with the second intake pipe 48 and a sub-space 62 facing the communication portion 56, and an open position, in which the main space 60 and the sub-space 62 are integrated with each other.

11 Claims, 6 Drawing Sheets

Low to middle speed region
(Valve is closed)

The volume of each two spaces is almost equal.

AIR INTAKE DEVICE FOR MULTI-CYLINDER INTERNAL COMBUSTION ENGINE

BACKGROUND OF THE INVENTION

1. Field of the Invention

The present invention relates to an air intake device for a multi-cylinder internal combustion engine.

2. Background Art

Japanese Patent JP-A-2005-325696 discloses an air intake device of a V-type engine. The air intake device includes a surge tank having an internal space divided into an upper portion and a lower portion. The surge tank is disposed upwardly of the engine. The upper portion of the internal space of the surge tank functions as a surge tank for a first bank of the engine. The lower portion of the internal space of the surge tank functions as a surge tank for a second bank of the engine. A partition between the upper portion and the lower portion of the surge tank includes an on/off valve. With the on/off valve closed, the upper portion of the surge tank is shut off from the lower portion thereof. With the on/off valve open, the upper portion of the surge tank communicates with the lower portion thereof.

Generally speaking, a small surge tank volume improves torque in low to middle speed regions and response, while reducing torque in a high speed region. A large surge tank volume, on the other hand, improves torque in the high speed region and reduces torque in the low to middle speed regions.

In the air intake device of the known art, the upper portion and the lower portion of the surge tank each function as a small surge tank for the corresponding bank with the on/off valve closed in the low to middle speed regions. In the high speed region, the upper portion and the lower portion of the surge tank function integrally as a large surge tank with the on/off valve opened. This improves engine torque throughout the entire speed region.

Including the above-mentioned document, the applicant is aware of the following documents as a related art of the present invention.

[Patent Document 1] Japanese Patent JP-A-2005-325696
[Patent Document 2] Japanese Patent JP-A-2007-16755
[Patent Document 3] Japanese Patent JP-A-2003-307159

The air intake device of the known art, however, has the following problem. Specifically, when the on/off valve is opened, a vane of the on/off valve advances into the upper and lower tank space to block an air flow, leading to increased suction resistance.

In addition, in the air intake device of the known art, it is necessary to make the on/off valve as large as possible in order to have a sufficiently large opening area when the on/off valve is open. A large on/off valve, however, contributes to a narrow flow path cross-sectional area when the on/off valve is open, which makes it necessary to make the surge tank higher. Such an air intake device as this one requires that the surge tank be disposed in a space between the engine and an engine hood, imposing stringent restrictions on the height of the surge tank. If the surge tank is tall, therefore, it makes it impossible to dispose the surge tank at an optimum position, at which each cylinder has an equal intake pipe length. This results in a problem of varying intake pipe lengths among different cylinders.

SUMMARY OF THE INVENTION

The present invention has been made to solve the foregoing problems and it is an object of the present invention to provide an air intake device of a multi-cylinder internal combustion engine, the system being capable of exhibiting a surge tank volume variable effect through opening and closing of a valve, ensuring small suction resistance when the valve is open, and working advantageously in having an equal intake pipe length for each cylinder.

The above object is achieved by an air intake device for a multi-cylinder internal combustion engine having two cylinder banks. The air intake device includes a tank having an upper tank chamber, a lower tank chamber disposed downwardly of the upper tank chamber, and a communication portion providing communication between an internal space of the upper tank chamber and an internal space of the lower tank chamber. The air intake device also includes a plurality of first intake pipes having communication with the upper tank chamber. The first intake pipes supply air to a first cylinder bank. The air intake device further includes a plurality of second intake pipes having communication with the lower tank chamber. The second intake pipes supply air to a second cylinder bank. The air intake device further includes a valve disposed in either the upper tank chamber or the lower tank chamber. The valve is displaced between a closed position and an open position. In the closed position, the internal space of either the upper or lower tank chamber, whichever is mounted with the valve, is divided into a main space having communication with the first intake pipes or the second intake pipes and a sub-space facing the communication portion. In the open position, the main space and the sub-space are integrated with each other. The internal space of the upper tank chamber and the internal space of the lower tank chamber are integrated with each other through the communication portion to function, as a whole, as a single surge tank when the valve is in the open position. A space integrating the internal space of either the upper tank chamber or the lower tank chamber, whichever is not mounted with the valve, with the sub-space through the communication portion, and the main space each function as an independent surge tank when the valve is in the closed position.

Other objects and further features of the present invention will be apparent from the following detailed description when read in conjunction with the accompanying drawings.

BEST MODE OF CARRYING OUT THE INVENTION

An air intake device according to an embodiment of the present invention is for a V-type 6-cylinder engine. The air intake device is particularly well adaptable for an engine mounted longitudinally relative to the vehicle (mounted so that a crankshaft center extends in parallel with the vehicle longitudinal direction in a plan view).

Figures 6A, 6B:
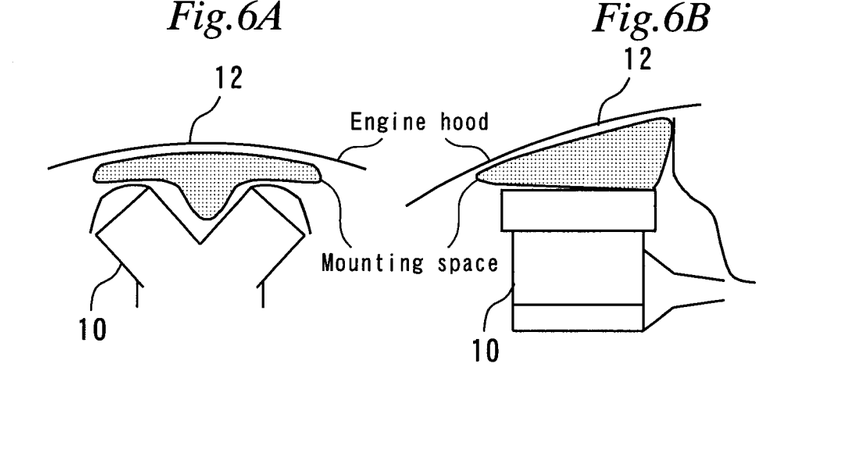
FIGS. 6A and 6B are views showing a mounting space of an air intake device of a V-type engine that is longitudinally mounted in the vehicle.

FIGS. 6A and 6B are views showing a mounting space of an air intake device of a V-type engine that is longitudinally mounted in the vehicle. FIG. 6A is a view as viewed from the front of the vehicle. FIG. 6B is a view as viewed from a side of the vehicle. Referring to FIGS. 6A and 6B, the air intake device of the V-type engine needs to be disposed in a clearance between an engine main body 10 and an engine hood 12. Accordingly, there are stringent restrictions on the height of the surge tank in the air intake device of the V-type engine. Referring to FIG. 6B, since the engine hood 12 is sloped downwardly toward the front, restrictions on height become even more stringent toward the front of the vehicle.

Before describing the air intake device according to the embodiment of the present invention, an air intake device of a comparative example will first be described for easier understanding of the effects of the present invention.

COMPARATIVE EXAMPLE

Figure 7:
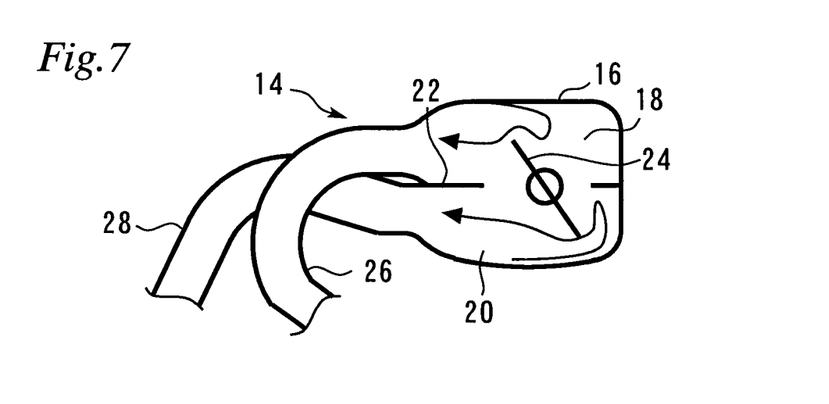
FIG. 7 is cross-sectional views showing an air intake device according to the comparative example.
Figure 8:
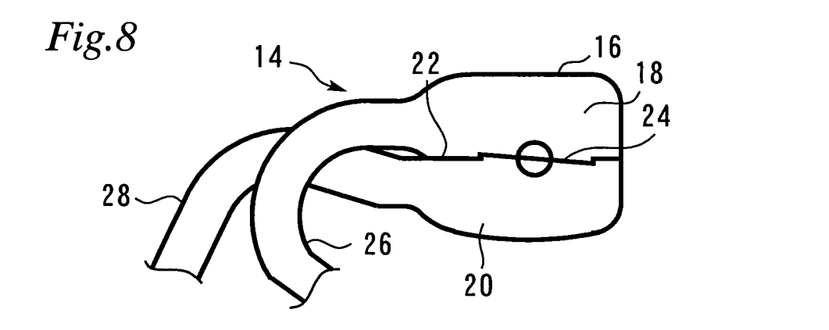
FIG. 8 is cross-sectional views showing the air intake device according to the comparative example.

FIGS. 7 and 8 are cross-sectional views showing an air intake device 14 according to the comparative example. Referring to FIGS. 7 and 8, the air intake device 14 has a surge tank 16. The surge tank 16 has an internal space divided into an upper space 18 and a lower space 20. A partition 22 and a valve 24 are disposed at a boundary between the upper space 18 and the lower space 20. A plurality of first intake pipes 26 and a plurality of second intake pipes 28 protrude from the surge tank 16. The first intake pipes 26 supply a first bank of the V-type engine with air, while the second intake pipes 28 supply a second bank of the V-type engine with air.

Referring to FIG. 7, when the valve 24 is open, the upper space 18 and the lower space 20 are in communication with each other, both functioning as an integral surge tank. When the valve 24 is closed, on the other hand, the upper space 18 is shut off from the lower space 20, so that each functions as an independent surge tank.

Generally speaking, a small surge tank volume improves torque in the low to middle speed regions and response, while reducing torque in the high speed region. A large surge tank volume, on the other hand, improves torque in the high speed region and reduces torque in the low to middle speed regions.

In the air intake device 14, the engine torque can be improved throughout the entire speed range by closing the valve 24 in the low to middle speed regions and opening the valve 24 in the high speed region. The air intake device 14 of the comparative example as described above, however, have the following several problems.

(Problem 1)

An arrow curve shown in FIG. 7 indicates an air flow when the valve 24 is open. As shown in FIG. 7, in the air intake device 14, opening the valve 24 causes a vane of the valve 24 to advance into the upper space 18 and the lower space 20, producing larger resistance (hereinafter referred to as "suction resistance") to flow into the intake pipes 26, 28. This results in reduced air intake efficiency.

(Problem 2)

Figure 9:
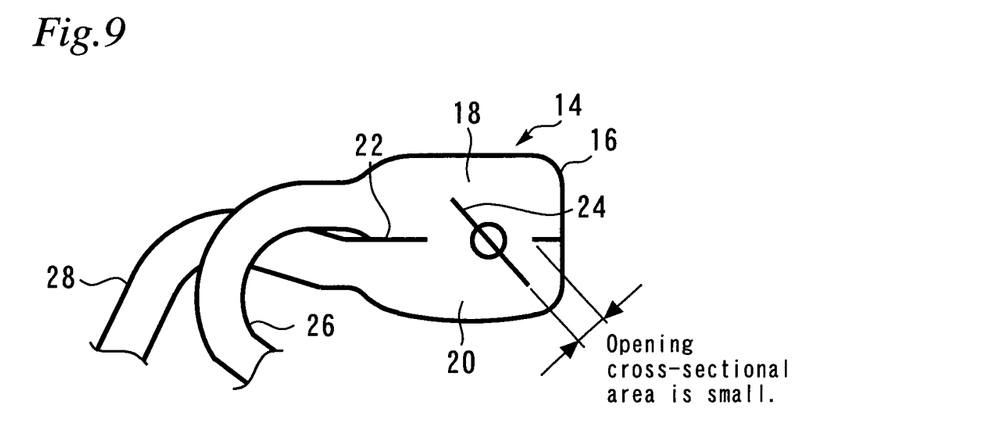
FIG. 9 is cross-sectional views showing the air intake device according to the comparative example.
Figure 10:
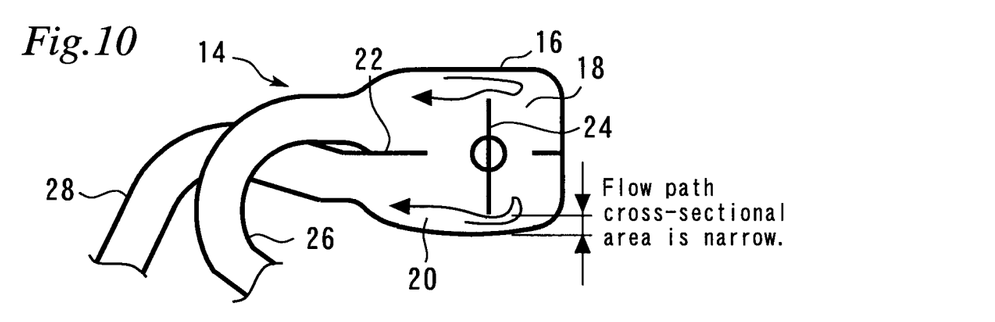
FIG. 10 is cross-sectional views showing the air intake device according to the comparative example.

When the valve 24 is opened as shown in FIG. 9, the vane of the valve 24 is left existing at a communication portion between the upper space 18 and the lower space 20, resulting in a small substantial opening cross-sectional area. The upper space 18 and the lower space 20 are not therefore sufficiently integrated together, so that the effect of increasing the surge tank volume in the high speed region tends to be canceled.

To enlarge the substantial opening cross-sectional area, the vane of the valve 24 needs to be opened to an angle near 90°. This results in an even smaller gap between the vane of the valve 24 and a bottom surface of the surge tank 16 and between the vane of the valve 24 and a ceiling of the surge tank 16. This, in turn, leads to a narrower flow path cross-sectional area, thus increasing the suction resistance even further. The surge tank 16 may be made to have a taller height to make the gap greater. It is, however, difficult to make the surge tank 16 taller because of restrictions of the mounting space as shown in FIGS. 6A and 6B.

(Problem 3)

Figure 11:
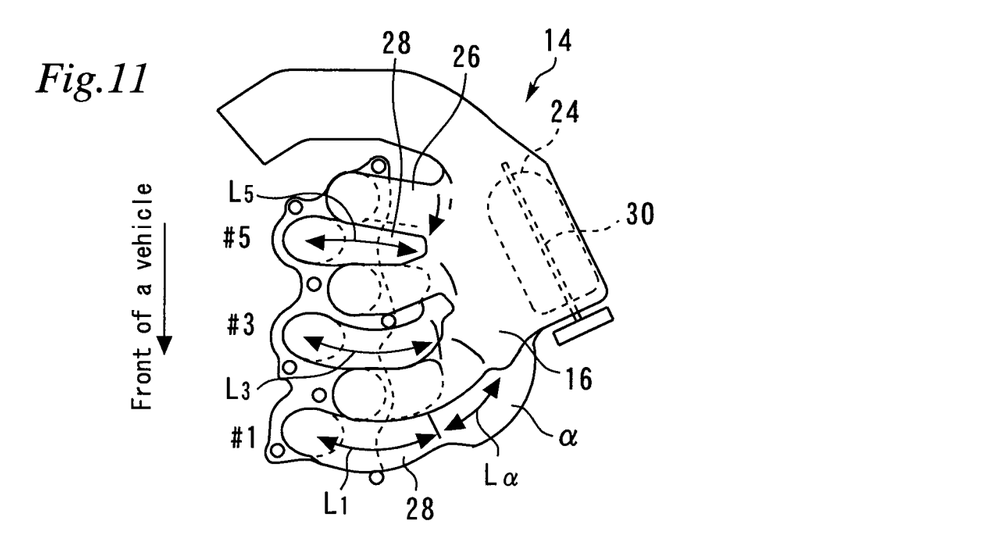
FIG. 11 is a plan view showing the air intake device according to the comparative example.

As described above, in the air intake device 14 according to the comparative example, the substantial opening cross-sectional area between the upper space 18 and the lower space 20 tends to become small. This makes it necessary to make the valve 24 have as large a diameter as possible. A larger diameter of the valve 24, however, poses the following problem. FIG. 11 is a plan view showing the air intake device 14 according to the comparative example. In FIG. 11, the downward direction is toward the front of the vehicle. Referring to FIG. 11, the three second intake pipes 28 supply air to corresponding cylinders (cylinder #1, cylinder #3, and cylinder #5) of the second bank of the V-type six-cylinder engine, respectively. The second intake pipes 28 for cylinder #1, cylinder #3, and cylinder #5 have a substantially equal length; specifically, a length $L_1$ of the second intake pipe 28 for cylinder #1, a length $L_3$ of the second intake pipe 28 for cylinder #3, and a length $L_5$ of the second intake pipe 28 for cylinder #5 being substantially identical to each other.

As described earlier, the mounting space for the air intake device has a height that becomes lower toward the front of the vehicle. If the valve 24 is adapted to have a large diameter, then the valve 24 consequently becomes taller. As a result, the valve 24 cannot be accommodated toward the front of the vehicle. This makes it inevitable to move the valve 24 toward the rear of the vehicle and thereby dispose the valve 24 in a position tilted relative to a rotation axis 30. The surge tank 16 is resultantly awkwardly shaped. In the example shown in FIG. 11, therefore, the surge tank 16 is shaped like a thick pipe at a root of the second intake pipe 28 for cylinder #1 (portion indicated by reference numeral a in FIG. 11). Consequently, cylinder #1 has a substantial intake pipe length of $(L_1+L_\alpha)$ including a length $L_\alpha$ at the root of the second intake pipe 28 for cylinder #1. The result is uneven intake pipe lengths among intake pipes for different cylinders. Uneven intake pipe lengths result in such problems as decreased maximum torque and unclear intake noise.

First Embodiment

Figure 1:
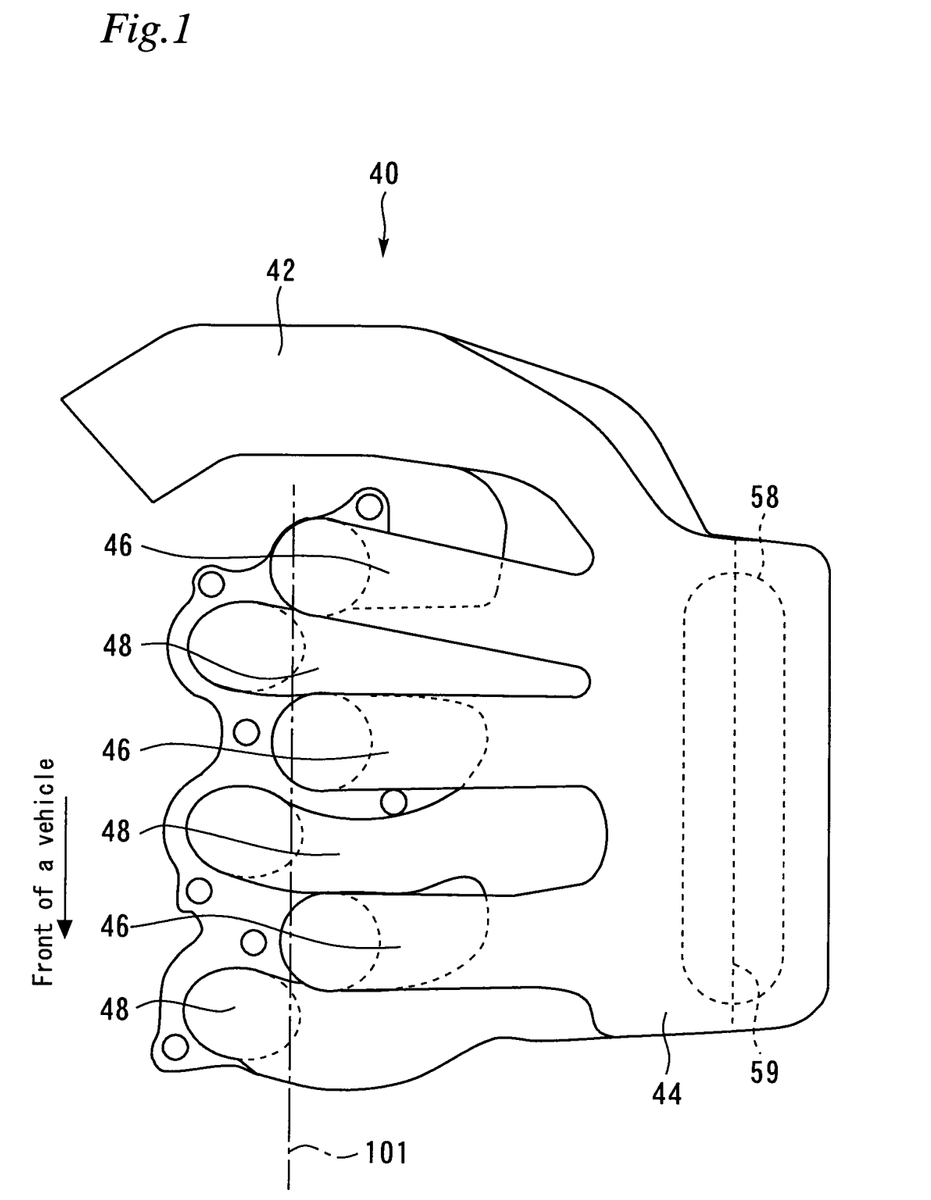
FIG. 1 is a plan view showing an air intake device according to the first embodiment of the present invention.

Unlike the air intake device 14 of the comparative example, an air intake device according to a first embodiment of the present invention can solve the foregoing problems. FIG. 1 is a plan view showing an air intake device 40 according to the first embodiment of the present invention.

Referring to FIG. 1, the air intake device 40 according to the first embodiment of the present invention is for a V-type 6-cylinder engine, comprising an air collector 42 and a surge tank 44 disposed to continue from the air collector 42. Three first intake pipes 46 and three second intake pipes 48 extend, respectively, from the surge tank 44. The surge tank 44 is substantially rectangular in the plan view, extending in a longitudinal direction that is substantially in parallel with a crankshaft center 101 of a V-type 6-cylinder engine 100.

Figure 2:
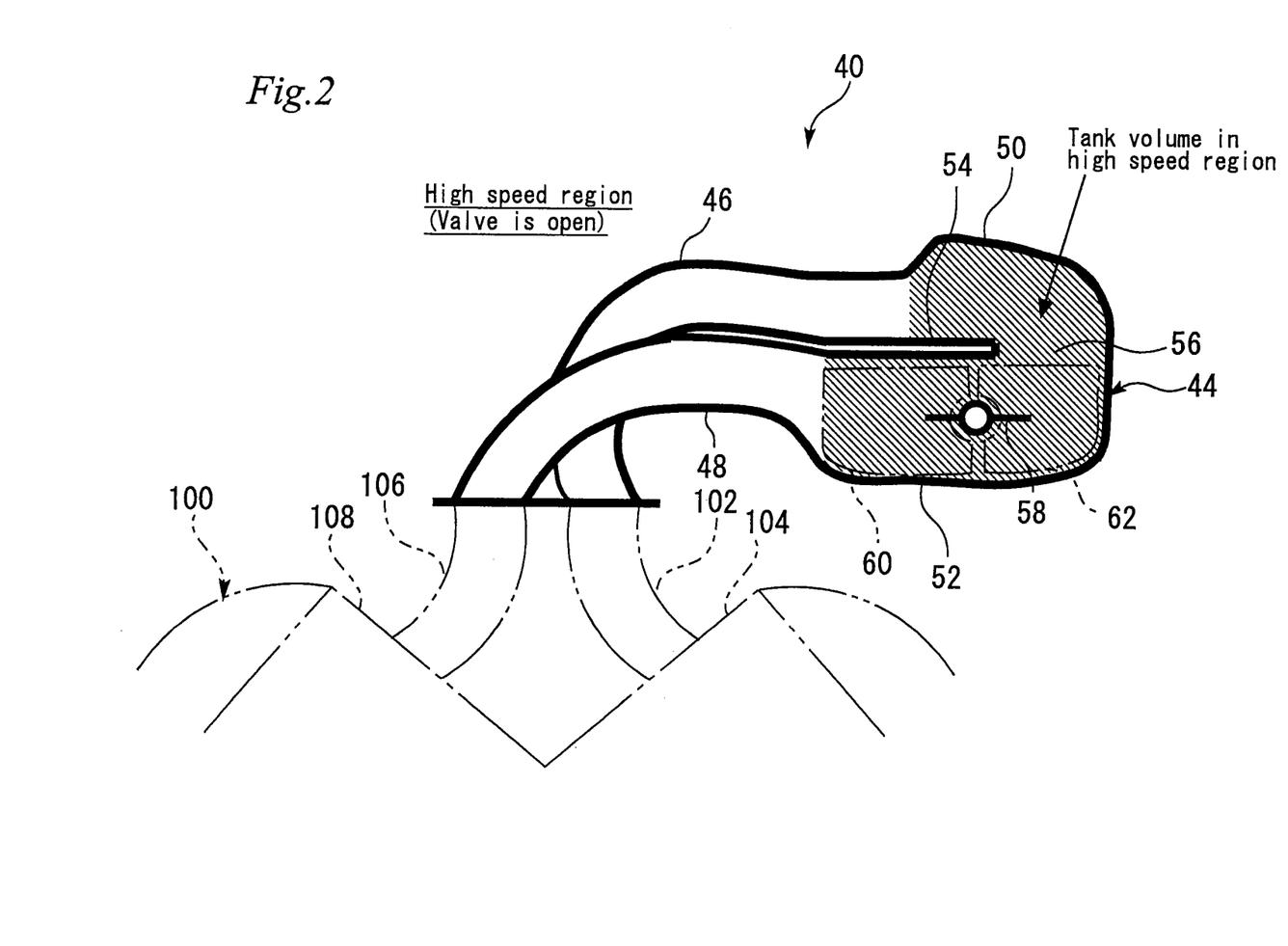
FIG. 2 is a cross-sectional view showing the air intake device shown in FIG. 1 and a view showing part of the V-type 6-cylinder engine, as viewed from the front of the vehicle.

FIG. 2 is a cross-sectional view showing the air intake device 40 shown in FIG. 1 and a view showing part of the V-type 6-cylinder engine 100, as viewed from the front of the vehicle. Referring to FIG. 2, the three first intake pipes 46 are connected to a first bank (cylinder bank) 104 of the V-type 6-cylinder engine 100 via an extension pipe 102. The three second intake pipes 48 are connected to a second bank (cylinder bank) 108 of the V-type 6-cylinder engine 100 via an extension pipe 106. Specifically, the three first intake pipes 46 supply air to each cylinder (cylinder #2, cylinder #4, and cylinder #6) of the first bank 104, and the three second intake pipes 48 supply air to each cylinder (cylinder #1, cylinder #3, and cylinder #5) of the second bank 108.

Figure 3:
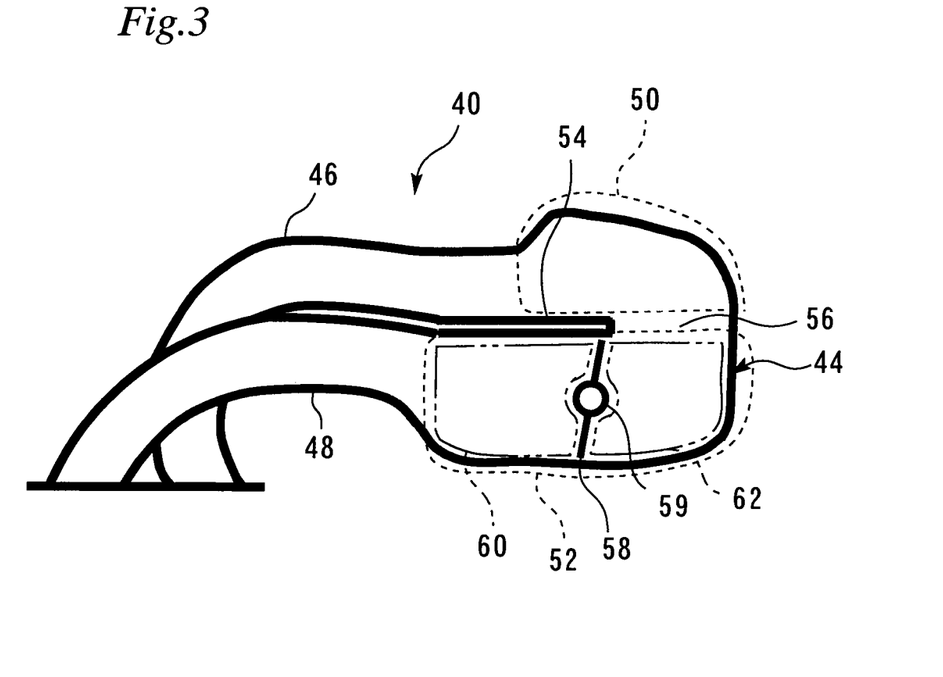
FIG. 3 is a cross-sectional view showing the air intake device shown in FIG. 1.

FIG. 3 is a cross-sectional view showing the air intake device 40 shown in FIG. 1. Referring to FIG. 3, the surge tank 44 has an upper tank chamber 50 and a lower tank chamber 52. The upper tank chamber 50 is disposed upwardly in the surge tank 44, while the lower tank chamber 52 is disposed downwardly of the upper tank chamber 50. The first intake pipes 46 are in communication with the upper tank chamber 50 and the second intake pipes 48 are in communication with the lower tank chamber 52. The upper tank chamber 50 is separated from the lower tank chamber 52 by a partition 54 at a portion on a side adjacent the first intake pipes 46 and the second intake pipes 48. The upper tank chamber 50 and the lower tank chamber 52 are in communication with each other through a communication portion (opening) 56 at a portion on a side opposite the first intake pipes 46 and the second intake pipes 48.

The lower tank chamber 52 is mounted with a valve 58. The valve 58 according to the first embodiment of the present invention is a butterfly valve having a vane that rotates about a rotation axis 59. The valve 58 has a slender shape extending in a direction perpendicular to a plane of paper of FIG. 3. Referring to FIG. 1, the rotation axis 59 extends substantially in parallel with the crankshaft center 101 of the V-type 6-cylinder engine 100 in the plan view. Further, the valve 58 is formed to extend substantially over an entire length of the surge tank 44 in the longitudinal direction.

FIG. 3 shows a condition, in which the valve 58 is in a closed position. In this condition, the lower tank chamber 52 has an internal space separated between a main space 60 and a sub-space 62. The main space 60 communicates with the second intake pipes 48, but does not face the communication portion 56. The sub-space 62 does not communicate with the second intake pipes 48, but faces the communication portion 56.

FIG. 2 shows a condition, in which the valve 58 is in an open position. In accordance with the first embodiment of the present invention, the valve 58 is open when the V-type 6-cylinder engine 100 is in the high speed region. With the valve 58 in the open position, the main space 60 and the sub-space 62 are in communication with each other, becoming an integrated space. Specifically, the lower tank chamber 52 has a single, integrated internal space. In addition, the lower tank chamber 52 and the upper tank chamber 50 are in communication with each other via the communication portion 56. Consequently, the internal space of the upper tank chamber 50 and the internal space of the lower tank chamber 52 are integrated with each other through the communication portion 56 when the valve 58 is open. The whole (shaded portion in FIG. 2) of these internal spaces functions as a single surge tank. This allows a substantial tank volume to be sufficiently large, thus improving the engine torque in the high speed region sufficiently.

Figure 4:
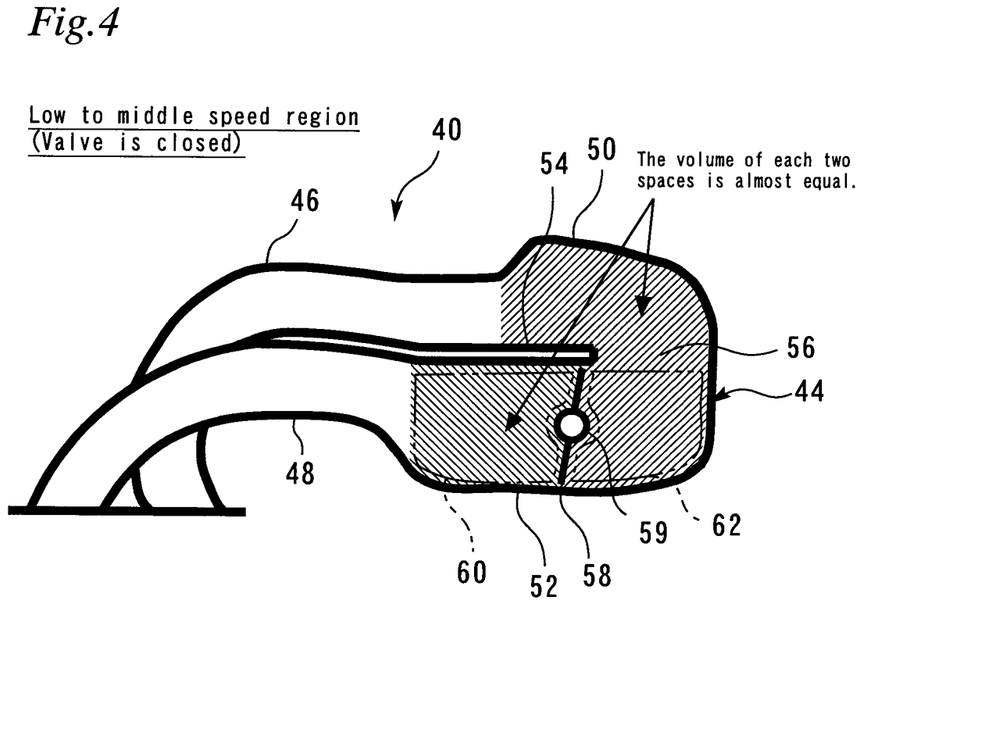
FIG. 4 is a cross-sectional view showing the air intake device shown in FIG. 1.

When the V-type 6-cylinder engine 100 is in the low to medium speed regions, on the other hand, the valve 58 is closed in accordance with the first embodiment of the present invention. FIG. 4 is a view for illustrating a tank volume when the valve 58 is closed. With the valve 58 closed, the internal space of the lower tank chamber 52 is divided into the main space 60 and the sub-space 62, each being separated from each other, as described earlier. The sub-space 62, meanwhile, is in communication with the internal space of the upper tank chamber 50 through the communication portion 56. Accordingly, a space (portion shaded with lines downwardly sloping toward the left in FIG. 4) integrating the internal space of the upper tank chamber 50 with the sub-space 62 of the lower tank chamber 52 through the communication portion 56 and the main space 60 (portion shaded with lines downwardly sloping toward the right in FIG. 4) of the lower tank chamber 52 each serve as an independent surge tank. Specifically, the space integrating the internal space of the upper tank chamber 50 with the sub-space 62 through the communication portion 56 functions as a surge tank for the cylinders connected to the first intake pipes 46, while the main space 60 functions as a surge tank for the cylinders connected to the second intake pipes 48. This allows the substantial tank volume to be sufficiently small in the low to medium speed regions, so that the engine torque can be sufficiently improved and response can be improved.

Preferably, the space (portion shaded with lines downwardly sloping toward the left in FIG. 4) integrating the internal space of the upper tank chamber 50 with the sub-space 62 through the communication portion 56 has a volume substantially identical to that of the main space 60 (portion shaded with lines downwardly sloping toward the right in FIG. 4). This allows air intake characteristics to be uniform between the cylinders connected to the first intake pipes 46 and the cylinders connected to the second intake pipes 48 with the valve 58 closed.

Figure 5:
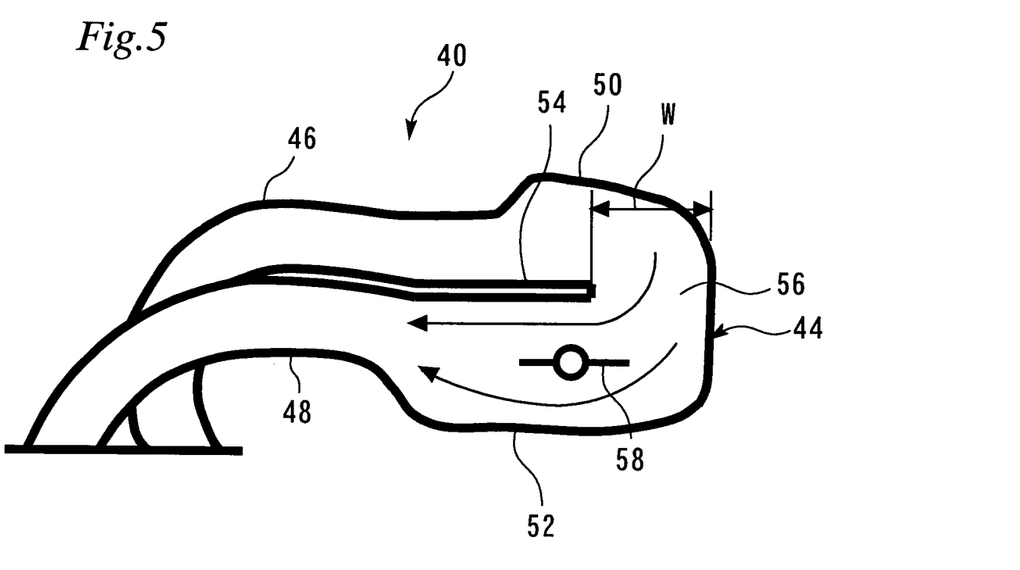
FIG. 5 is a cross-sectional view showing the air intake device shown in FIG. 1.

FIG. 5 is a view showing an air flow in the surge tank 44 when the valve 58 is open. When the valve 58 is open, the vane of the valve 58 is in a position extending substantially in parallel with the air flow to the second intake pipes 48, and with the partition 54. Accordingly, in the air intake device 40 according to the first embodiment of the present invention, the valve 58 can be positively prevented from serving as a block against the air flow into the second intake pipes 48. Suction resistance can therefore be sufficiently reduced and good air intake efficiency can be achieved.

Referring to FIG. 5, in the air intake device 40 according to the first embodiment of the present invention, the valve 58 is not disposed at the communication portion 56. A width W of the communication portion 56 can therefore be directly reflected in an opening cross-sectional area between the upper tank chamber 50 and the lower tank chamber 52. As a result, the effective opening cross-sectional area between the upper tank chamber 50 and the lower tank chamber 52 can be sufficiently wide, so that, when the valve 58 is open, the upper tank chamber 50 and the lower tank chamber 52 can be sufficiently integrated with each other for the even further improved performance in the high speed region.

In the air intake device 40 according to the first embodiment of the present invention, the width W of the communication portion 56 does not depend on a diameter of the valve 58. This eliminates the need for making the diameter of the valve 58 large with the aim of allowing for the width W of the communication portion 56. The valve 58 can therefore have a relatively small diameter, which allows the valve 58 to be disposed at a position toward the front of the vehicle, at which the mounting space in the height direction is small. This eliminates the need for such arrangements as moving the valve 24 toward the rear of the vehicle or shaping the surge tank 16 awkwardly, as done in the air intake device 14 of the comparative example shown in FIG. 11. As a result, referring back to FIG. 1, the valve 58 and the surge tank 44 can be appropriately disposed so as to extend substantially in parallel with the crankshaft center 101 of the engine 100 in the plan view. As a result, each cylinder can positively be adapted to have an equal substantial intake pipe length. An adverse effect produced from uneven intake pipe lengths can be positively prevented.

The first embodiment of the present invention has been described heretofore as an arrangement having the valve 58 disposed in the lower tank chamber 52. The valve 58 may, instead, be disposed in the upper tank chamber 50 as another embodiment to which the present invention is applied.

The present invention has been described in detail with particular reference to the first preferred embodiment thereof as applied to the V-type 6-cylinder engine. The number of cylinder of the engine to which the present invention is applicable is not, however, limited to six. In addition, the cylinder arrangement is not limited to the V type and the present invention can also be applied, for example, to a horizontally opposed engine.

Aspects of the present invention described above and the major benefits thereof are summarized as follows:

A first aspect of the present invention relates to an air intake device for a multi-cylinder internal combustion engine having two cylinder banks. The air intake device includes a tank having an upper tank chamber, a lower tank chamber disposed downwardly of the upper tank chamber, and a communication portion providing communication between an internal space of the upper tank chamber and an internal space of the lower tank chamber; a plurality of first intake pipes having communication with the upper tank chamber, the first intake pipes supplying air to a first cylinder bank; a plurality of second intake pipes having communication with the lower tank chamber, the second intake pipes supplying air to a second cylinder bank; and a valve disposed in either the upper tank chamber or the lower tank chamber, the valve being displaced between a closed position, in which the internal space of either the upper or lower tank chamber, whichever is mounted with the valve, is divided into a main space having communication with the first intake pipes or the second intake pipes and a sub-space facing the communication portion, and an open position, in which the main space and the sub-space are integrated with each other; wherein the internal space of the upper tank chamber and the internal space of the lower tank chamber are integrated with each other through the communication portion to function, as a whole, as a single surge tank when the valve is in the open position, and wherein a space integrating the internal space of either the upper tank chamber or the lower tank chamber, whichever is not mounted with the valve, with the sub-space through the communication portion, and the main space each function as an independent surge tank when the valve is in the closed position.

A second aspect of the present invention relates to the air intake device according to the first aspect. In this device, the space integrating the internal space of either the upper tank chamber or the lower tank chamber, whichever is not mounted with the valve, with the sub-space through the communication portion has a volume substantially identical to that of the main space.

A third aspect of the present invention relates to the air intake device according to the first aspect. In this device, the valve has a vane extending substantially in parallel with an air flow in the tank when the valve is in the open position.

A fourth aspect of the present invention relates to the air intake device according to the first aspect. In this device, the tank includes a partition disposed therein, the partition separating the upper tank chamber partly from the lower tank chamber, and wherein the valve has a vane extending substantially in parallel with the partition when the valve is in the open position.

A fifth aspect of the present invention relates to the air intake device according to the first aspect. In this device, the tank extends in a longitudinal direction thereof that is substantially in parallel with a crankshaft center of the internal combustion engine in a plan view.

A sixth aspect of the present invention relates to the air intake device according to the first aspect. In this device, the valve is formed so as to extend substantially over an entire length of the tank in the longitudinal direction thereof.

In accordance with the first aspect of the present invention, the surge tank volume can be varied by opening or closing the valve. This improves the engine torque throughout the entire region. Particularly noteworthy is that the valve is not disposed in the communication portion (opening) between the upper tank chamber and the lower tank chamber. This arrangement provides a sufficiently wide effective opening cross-sectional area between the upper tank chamber and the lower tank chamber. As a result, the upper tank chamber and the lower tank chamber can be sufficiently integrated with each other when the valve is open, which sufficiently improves performance in the high speed region. When the valve is open, the valve can be positively prevented from serving as a block against an air flow into the intake pipe. Suction resistance can therefore be sufficiently reduced and good air intake efficiency can be achieved. In addition, the communication portion between the upper tank chamber and the lower tank chamber has a width that does not depend on a diameter of the valve. This eliminates the need for making the diameter of the valve large with the aim of allowing for the width of the communication portion. The valve can therefore have a relatively small diameter, which allows the valve to be disposed at a position toward the front of the vehicle, at which a mounting space in a height direction is small. This helps circumvent the need for such arrangements as moving the valve toward the rear of the vehicle or shaping the surge tank awkwardly. Accordingly, the valve can be disposed at an appropriate position and the surge tank shaped appropriately such that each cylinder has an equal intake pipe length.

In accordance with the second aspect of the present invention, the surge tank volume on a side of the first intake pipes can be made substantially identical to that on a side of the second intake pipes when the valve is closed. This allows the cylinders on the side of the first intake pipes and those on the side of the second intake pipes have uniform air intake characteristics.

In accordance with the third aspect of the present invention, the vane of the valve extends substantially in parallel with the air flow in the tank when the valve is open. The valve can therefore be even more positively prevented from serving as a block against the air flow into the intake pipe.

In accordance with the fourth aspect of the present invention, the vane of the valve extends substantially in parallel with the partition. The valve can therefore be even more positively prevented from serving as a block against the air flow into the intake pipe.

In accordance with the fifth aspect of the present invention, the tank extends in the longitudinal direction thereof that is substantially in parallel with the crankshaft center of the internal combustion engine in the plan view. This makes it extremely easy to arrange that each cylinder has an equal intake pipe length.

In accordance with the sixth aspect of the present invention, the valve is formed so as to extend substantially over the entire length of the tank in the longitudinal direction thereof. The surge tank volume variable effect through opening and closing of the valve can therefore be further improved.

The invention claimed is:

1. An air intake device for a multi-cylinder internal combustion engine having two cylinder banks, the air intake device comprising:
   a tank having an upper tank chamber, a lower tank chamber disposed downwardly of the upper tank chamber, and a communication portion providing communication between an internal space of the upper tank chamber and an internal space of the lower tank chamber;
   a plurality of first intake pipes having communication with the upper tank chamber, the first intake pipes supplying air to a first cylinder bank;
   a plurality of second intake pipes having communication with the lower tank chamber, the second intake pipes supplying air to a second cylinder bank; and
   a valve disposed in either the upper tank chamber or the lower tank chamber, the valve being displaceable between a closed position, in which the internal space of either the upper or lower tank chamber, whichever is mounted with the valve, is divided into a main space having communication with the first intake pipes or the second intake pipes and a sub-space facing the communication portion, and an open position, in which the main space and the sub-space are integrated with each other;
   wherein the internal space of the upper tank chamber and the internal space of the lower tank chamber are integrated with each other through the communication portion to function, as a whole, as a single surge tank when the valve is in the open position,
   wherein a space integrating the internal space of either the upper tank chamber or the lower tank chamber, whichever is not mounted with the valve, with the sub-space through the communication portion, and the main space each function as an independent surge tank when the valve is in the closed position,
   wherein a partition separating the upper tank chamber from the lower tank chamber, and a bottom surface of the lower tank or a ceiling surface of the upper tank, which faces the partition are formed in the tank,
   wherein the valve is placed between the partition, and the bottom surface or the ceiling surface, and
   wherein the valve rotates about a rotation axis extending in a direction transverse to a direction of flow in at least one of the first intake pipes or second intake pipes where the first or second intake pipes communicate with the respective upper or lower tank.

2. The air intake device according to claim 1, wherein the space integrating the internal space of either the upper tank chamber or the lower tank chamber, whichever is not mounted with the valve, with the sub-space through the communication portion has a volume substantially identical to that of the main space.

3. The air intake device according to claim 1, wherein the valve has a vane extending substantially in parallel with an air flow in the tank when the valve is in the open position.

4. The air intake device according to claim 1, wherein the tank includes a partition disposed therein, the partition separating the upper tank chamber partly from the lower tank chamber, and
wherein the valve has a vane extending substantially in parallel with the partition when the valve is in the open position.

5. The air intake device according to claim 1, wherein the tank extends in a longitudinal direction thereof that is substantially in parallel with a crankshaft center of the internal combustion engine in a plan view.

6. The air intake device according to claim 1, wherein the valve is formed so as to extend substantially over an entire length of the tank in the longitudinal direction thereof.

7. The air intake device according to claim 1, wherein the rotation axis of the valve is parallel to a crankshaft of the internal combustion engine.

8. The air intake device according to claim 1, wherein the first intake pipes are directly connected to the upper tank chamber.

9. The air intake device according to claim 8, wherein the second intake pipes are directly connected to the lower tank chamber.

10. The air intake device according to claim 9, wherein the first intake pipes are disposed at a level above the second intake pipes.

11. The air intake device according to claim 1, wherein the rotation axis extends in a direction transverse to a direction of motion of cylinders in the cylinder banks.

* * * * *